United States Patent Office 3,367,457
Patented Feb. 6, 1968

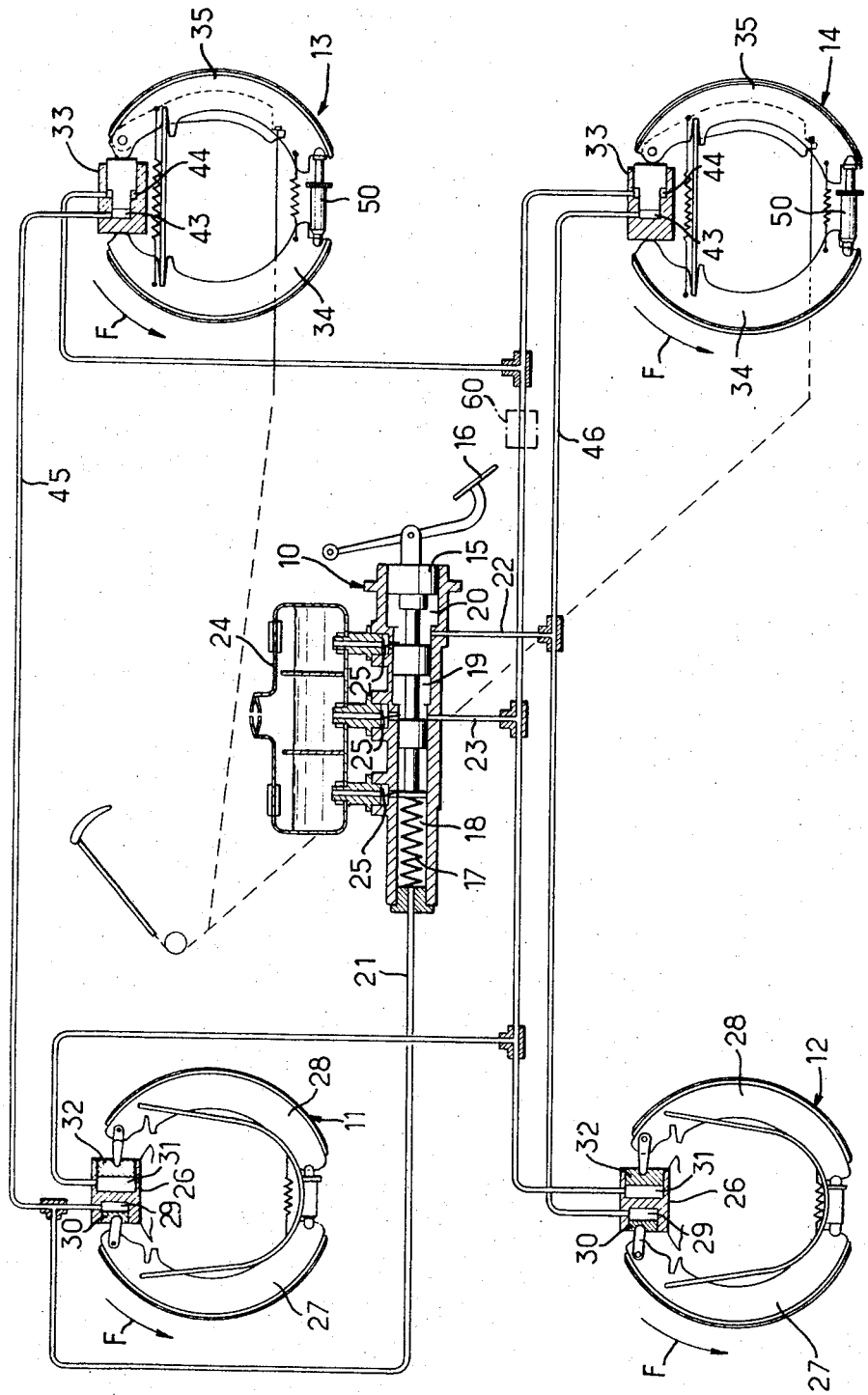

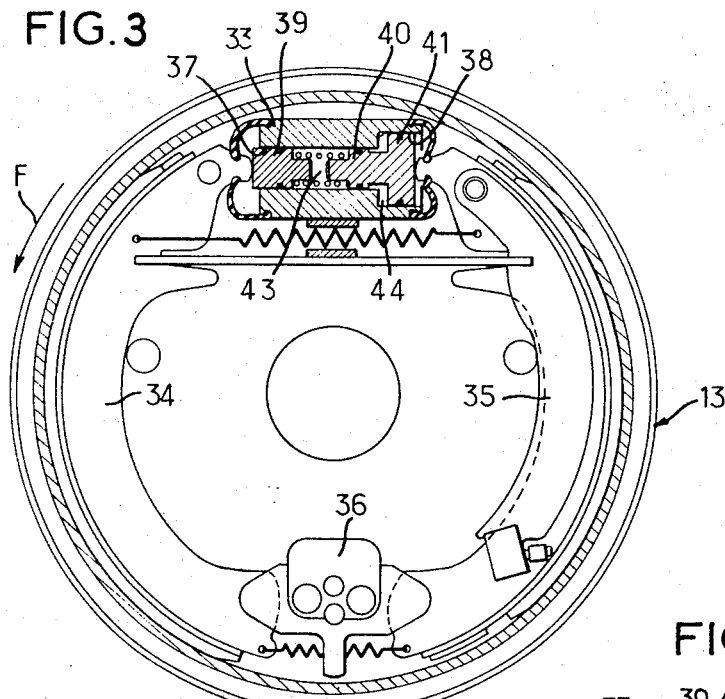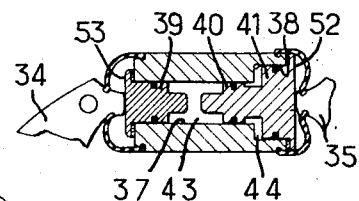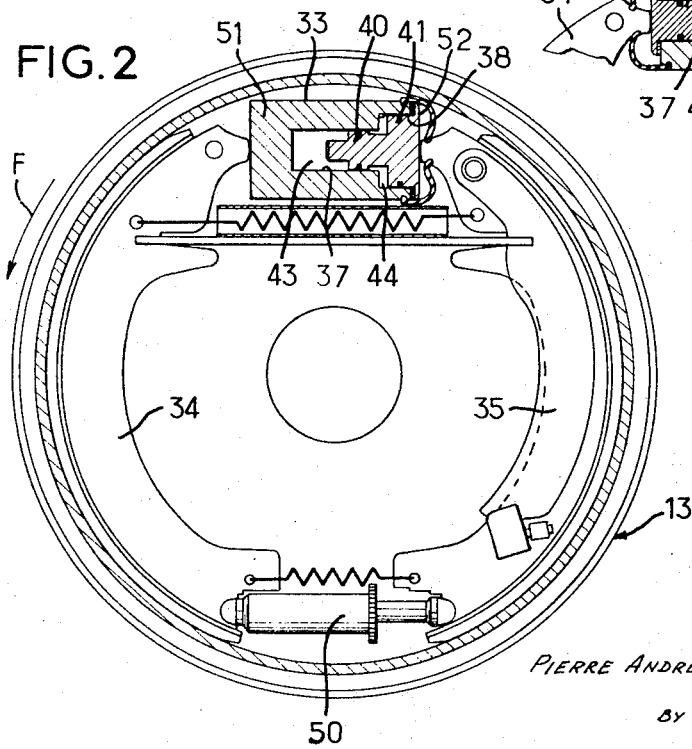

3,367,457
BRAKING INSTALLATIONS FOR AUTOMOTIVE VEHICLES
Pierre André Georges Lepelletier, Chatou, France, assignor to Societe Anonyme Francaise du Ferodo, a corporation of France
Filed Feb. 15, 1966, Ser. No. 527,685
Claims priority, application France, Feb. 23, 1965, 6,647
7 Claims. (Cl. 188—152)

ABSTRACT OF THE DISCLOSURE

A braking installation for automotive vehicles comprises the usual brakes on a first axle, actuated by a master cylinder, and having their reaction applied to the brakes on a second axle. But the brakes on the second axle are actuated by a cylinder having two bores or different diameters, in which a double piston operates and defines a central chamber and an annular chamber. One chamber receives pressure from the master cylinder, while the other chamber receives the reaction pressure from the first axle brakes.

---

The present invention is concerned with braking installations for automotive vehicles, in which a master-cylinder actuates the brakes of a first axle while the reaction which results develops a pressure which is employed for the application of the brakes of a second axle.

In installations of this kind, the application of the brakes of the second axle is dependent on the conditions in which the reaction is supplied by the first axle and, for the purpose of ensuring a suitable gripping effort under all circumstances, the present invention has for its object improvements according to which each brake of the second axle is applied, not only by the effect of the pressure due to the reaction of the brakes of the first axle, but also by the effect of the pressure, or as the case may be, of one and/or the other of the pressures developed by the master-cylinder for the actuation of the brakes of the first axle.

The first axle may be for example a front axle, and the second axle may be a rear axle of the vehicle.

The present invention relates more particularly to braking installations for automotive vehicles, in which a master-cylinder with three circuits supplies the front brakes by two circuits acting on the right and the left-hand known as primary circuits, and a common reaction circuit or so-called secondary circuit, to cause simultaneously their application and their balancing, while the pressure of the secondary circuit is utilized for applying the rear brakes.

Braking installations of this kind, which have been put into practical use by the applicant under the general denomination of "self-stabilizing brakes" give excellent performances in respect of stability and balancing which have been established by comparative tests with respect to conventional braking installations, during the course of which it could be seen that if the differences of adhesion occurred between the right-hand side and the left-hand side of the vehicle, a vehicle equipped with self-stabilizing brakes was subjected to a pivotal moment substantially less than that to which the same vehicle was subjected when equipped with conventional brakes.

The applicant has made very extensive studies and experiments on this phenomenon of pivotal moment, and have discovered that further progress in the direction of safety is possible when the rear brakes are supplied in an appropriate manner.

The present invention has more particularly for its object improvements in braking installations for vehicles which provide increased safety in the event of locking of one or more wheels, and in addition which give the rear brakes a high power irrespective of the circumstances, and even giving the user the possibility of acting in certain cases up to the locking of one or the other or of both rear wheels.

According to the invention, each rear brake is applied not only by the action of the so-called secondary pressure of the reaction circuit of the front brakes, but also by the action of one and/or the other of the pressures, known as primary pressures, by which the master-cylinder supplies the said front brakes.

More particularly, according to the invention, the rear brakes are supplied not under the same pressure but under pressures which correspond to the differences of adhesion which can occur between the right-hand side and the left-hand side of the vehicle, so as to reduce, annul and even in certain cases reverse the pivotal moment.

According to the present invention each rear brake is given a braking power which can vary with the adhesion encountered on the ground, taken separately for each side, as is the case for example for the front brakes of self-stabilizing brake installations, and following appropriate and well-defined characteristics.

According to the invention, the braking installation is a self-stabilizing brake installation, in which the rear brakes are self-releasing or predominantly self-releasing, and in which each rear brake is applied not only by the action of the secondary pressure but also by the action of the primary pressure of the corresponding front brake, taken separately for each side, the effects of these two pressures being additive in proportion to their working sections and their respective values. In the front brakes, the opposite effect is produced, the effects of these two pressures being subtractive in proportion to their working sections and their respective values.

A first consequence of the invention is that the differences of braking torque which can be produced on the front axle for any reason whatever, and which are always proportional to the difference of the primary pressures, are wholly reproduced on the rear axle but with a reversal of direction and with a given transfer factor K. I have:

$$\Delta C_{AR} = -K \Delta C_{av}$$

A second consequence of the invention is that, for the very reason of the type of construction adopted for the front brakes with permanent support for the action and reaction on the braking liquid, with the wheels blocked or not, the above relation always remains true irrespective of the condition of the front wheels, locked or not, and only requires that the rear wheels should not be locked.

A third consequence of the invention is that the pivotal moment, with the front wheels locked or not and the rear wheels not locked, is directly proportional to the algebraic sum;

$$\Delta C_{AV} + \Delta C_{AR}$$

which is equal to:

$$\Delta C_{AV} + \Delta C_{AR} = (1-K) \Delta C_{AV}$$

so that it is in fact possible to reduce, to annul, or even to reverse this pivotal moment by acting on the transfer ratio K with a view to increasing the deceleration more easily.

A fourth consequence of the invention is that the transfer factor K can be selected at any value appropriate to the type of vehicle, in accordance with its particular characteristics of load, steering, front and rear suspensions, and road-holding during braking in general, and may for example be chosen either less than unity or greater than unity, so as to contribute, by the corresponding modification of the pivotal moment, to the characteristics of under-steering or over-steering during braking, which it may be desired to give a vehicle when the limit of adhesion has been exceeded.

A fifth consequence of the invention is that the transfer factor K can be selected as strictly equal to unity, in such manner that the pivotal moment remains zero and in consequence the total braking power on the left-hand and right-hand sides remains identical for as long as possible, after locking of one or both front wheels included, a difference which is necessarily small only becoming apparent during the locking of one or the other or both of the two rear wheels.

A sixth consequence of the invention is that during normal braking on forward running, without locking either the front wheels or the rear wheels, the secondary pressure which is relatively large as compared with the primary pressures, maintains a closely-accurate balancing of the right and left-hand sides and the nominal front/rear distribution of the four braking torques selected as an optimum value for the vehicle, and this with a very great insensitivity to any possible variations of the coefficients of friction and of braking efficiency, contrary to conventional braking installations.

A seventh consequence of the invention is that when one of the primary pressures becomes defective, such as is the case during a failure of one of the primary circuits, the secondary pressure subsists and remains relatively large compared with the primary pressures, one of which is normal and the other zero, and maintains substantially the same right-hand/left-hand balancing and the same nominal front/rear distribution as during normal braking.

An eighth consequence of the invention is that the front-rear distribution of braking of the vehicle is no longer to be considered axle by axle but by separate sides, in view of the fact that during the locking of a single front wheel, the ratio of the secondary pressure to the primary pressure does not change on the side where the front wheel is not locked, but falls on the side where the front wheel is locked. The front/rear distribution of the non-locked side thus suffers no modification with respect to the rated distribution whereas it changes on the locked side by relative increase of the braking torque of the rear wheel, and this increase may extend up to the limit of adhesion for the purpose of maximum braking.

A ninth consequence of the invention is that during locking, not of a single front wheel but of both, the front/rear distributions vary the same on both sides by relative increase of the braking torques of the two rear right-hand and left-hand wheels, and this increase may extend to the limit of adhesion for the purpose of maximum braking.

A tenth consequence of the invention is that when the secondary pressure becomes defective, such as is the case during a failure of the secondary circuit, or only increases slightly as is the case during braking on reverse running, the primary braking subsists on both the front and rear axles instead of on the front axle only, as when the secondary pressure is employed alone for the application of the rear brakes. In particular, the rear brake may be arranged so as to provide, on reverse running, a given braking power with respect to the front brake, and for example, an equivalent power.

An eleventh consequence of the invention is that any device providing a transition in the braking of the rear axle, such as a pressure limiter, a depression device, a corrector device responsive either to the load or to the deceleration or to both, or to any other parameter, can be inserted in the rear secondary circuit without modifying in any respect any of the preceding consequences, which all derive from the transfer factor K operating on the primary pressures only.

In accordance with one form of embodiment of the invention, each rear brake comprises a wheel cylinder having a double piston operating in two bores of different diameters and defining a first chamber cooperating with one of the pistons of this double piston and a second chamber cooperating differentially with the two pistons of the said double piston, the second chamber receiving the secondary reaction pressure of the front brakes while the first chamber receives a pressure which results from one and/or the other of the primary pressures by which the master cylinder supplies the front brakes.

The pressure received by the small chamber of a rear brake is preferably that by which the master cylinder supplies the front brake located on the same side of the vehicle as the said rear brake.

The objects, characteristic features and advantages of the invention will furthermore be brought out in the description which follows below of forms of embodiment chosen by way of example, reference being made to the accompanying drawings in which:

FIG. 1 is a diagram of a braking installation of an automative vehicle in accordance with the invention;

FIG. 2 is a view in elevation of a rear brake of this installation;

FIG. 3 is a view similar to FIG. 2, but concerns an alternative form of rear brake;

FIG. 4 is a view of an alternative form of wheel cylinder which can be employed especially in the brake of FIG. 2, instead of the wheel cylinder shown in FIG. 2.

Reference will first be made to FIG. 1, in which there is seen at 10 a master-cylinder for the control of the braking of an automotive vehicle having two front brakes 11 and 12 and two rear brakes 13 and 14. The arrows F show the direction of rotation of the wheels for forward running.

The master-cylinder 10 comprises three stepped bores and receives a master-piston 15 which is actuated by a pedal 16 and brought back to rest by a restoring spring 17. The piston 15 defines in these bores: a first primary chamber 18, a secondary chamber 19, and a second primary chamber 20, all three being reduced in volume when the piston 15 is pushed in and more particularly, in such manner that the piston 15 displaces equivalent volumes of oil into conduits 21 and 22, coupled respectively to the chambers 18 and 20, and an additional volume of oil in a conduit 23 coupled to the chamber 19. The chambers 18, 19 and 20 are furthermore connected to separate compartments of a tank 24 through the intermediary of valves 25, which are partly open in the position of rest of the piston 15 and closed as soon as the piston is pushed inwards.

Each of the front brakes 11 and 12 comprises a wheel cylinder 26 and two jaws 27 and 28, under compression and in series. The cylinder 26 is divided into two compartments: a primary compartment 29 in which is mounted a primary piston 30 acting on the primary jaw 27, and a secondary compartment 31 in which is located a secondary piston 32 acting on the secondary jaw 28.

The primary compartment 29 fo the right-hand front brake 11 is connected to the conduit 21, while the primary compartment 29 of the left-hand front brake 12 is connected to the conduit 22. The secondary compartments 31 of the two brakes 11 and 12 are connected in common to the conduit 23.

Each of the rear brakes 13 and 14 comprises (FIGS. 1 and 2) a wheel cylinder 33 and also two jaws 34 and 35 coupled together by a free strap 50. The jaw 34 comes into abutment against one extremity 51 of the cylinder 33.

The cylinder 33 has a small bore 37 and a large bore 38 in alignment. A double piston 40, 41 cooperates with the jaw 35 and is engaged in the bores 37 and 38, with the piston 40 in the bore 37 and the piston 41 in the bore 38. The piston 41 is provided with a small collar 52 which limits its movement into the bore 38.

The cylinder 33 thus comprises a chamber 43 formed between the bottom 51 and the piston 40, and a chamber 44 formed between the pistons 40 and 41. The volume of the chamber 43 is variable due to the fact that the piston 40 is movable in the bore 37, while the volume of the chamber 44 is variable, in spite of the one-piece construction of the pistons 40 and 41, due to the presence of the two bores 37 and 38 of different diameters.

The chamber 43 of the rear right-hand brake 13 is connected by a conduit 35 (see FIG. 1) to the conduit 21, while the chamber 43 of the rear left-hand brake 14 is connected by a conduit 46 to the conduit 22. The chambers 44 of the two brakes 13 and 14 are connected in common to the conduit 23.

During braking in forward running (arrow F), equivalent volumes of fluid are expelled from the master-cylinder 10 through the conduits 21 and 22 into the primary chambers 30 of the front brakes 11 and 12 into the chambers 43 of the rear brakes 13 and 14. The braking reactions of the front brakes 11 and 12 are balanced by the intercommunication of the chambers 31 by means of the conduit 23. A strong pressure, controlled by the reduction in volume of the chamber 19 is established in the secondary circuit 23 and acts in the chambers 44 of the rear brakes 13 and 14 on the pistons 41, in order to increase the gripping force of the jaws 34 and 35. To this action is added those of each of the primary conduits 21, 45 and 22, 46 which supply pressure to the chambers 43.

During braking in reverse running, the reactions of the jaws 27 and 28 are reversed in the front brakes 11 and 12. The secondary pressure no longer rises at 23 as was the case during forward running. The primary pressures at 21, 45 and 21, 46 effectively actuate the four brakes 11, 12, 13, 14.

In addition, the arrangement which has just been described has the advantages of a better behaviour of the vehicle if there is a loss of adhesion of one or more wheels, an occurrence which may be very dangerous, together with increased safety in the event of a circuit fracture.

Whereas during normal operation when braking in forward running, the primary pressures at 21 and 22 are low, while the secondary pressure at 23 is preponderant and imposes the conditions of equilibrium between the right-hand and left-hand and between the front and the rear of the vehicle, if a loss of adhesion takes place on one of the front wheels, for example if the left-hand front wheel 12 becomes locked, these relative actions are modified.

For the left-hand side of the vehicle, the primary pressure at 22 is then high and increases the braking torque of the left-hand rear brake 14, without it being necessary to press harder on the brake pedal 16. As a whole, the sum of the braking torques over the right-hand half of the vehicle and the sum of the braking torques on the left-hand half are at the same time increased and differ very little from each other. This results in a very good stability of the vehicle together with effective braking.

If the two front wheels become locked, the braking continues to act effectively by the rear brakes, by virtue of the arrangement according to the invention, with the possibility of continuing when so desired up to locking of one or the other or both rear brakes for the purpose of maximum braking.

In the event of the secondary circuit 23 becoming defective, the pistons 32 come into abutment. The braking is effected on the front brakes 11 and 12 by the chambers 29, and on the rear brakes 13 and 14 by the chambers 43. The braking is preponderant on the front axle because of the small section of the chambers 43 of the rear brakes.

The device further provides adequate balancing in case of a fault in a primary circuit 21 or 22, in spite of a slight difference between the right-hand side and the left-hand side of the vehicle, established in any event in such manner as not to affect the control of steering.

In addition, according to the invention, any apparatus such as the apparatus shown by the reference 60 in FIG. 1, causing any transition in the braking of the rear axle, for example a pressure-limiter, a pressure-reducing device, a corrector device responsive either to the load or to the deceleration or to both or to any other parameter, can be inserted in the rear secondary circuit so as to act on the characteristics of braking of the rear wheels.

In an alternative form (see FIG. 3) each of the rear brakes 13 and 14 comprises a wheel-cylinder 33 together with a compressed jaw 34 and a jaw in tension 35, which co-operate with a fixed abutment 36. The cylinder 33 is provided with a small bore 37 and a large bore 38 in line. In the bore 37 is engaged a small additional piston 39 which cooperates with the compressed jaw 34, while a double piston 40, 41 cooperates with the tensioned jaw 35. The piston 40, 41 which has a small piston 40 and a large piston 41 is engaged in the two bores 37 and 38, with the piston 40 in the bore 37 and the piston 41 in the bore 38. The chamber 43 is formed between the pistons 39 and 40 while the chamber 34 is again formed between the pistons 40 and 41.

During normal braking, the action is effected more by the tensioned jaw 35 than by the compressed jaw 34 and this condition remains valid until the front wheels are locked, when the secondary pressure is no longer preponderant.

In a further alternative form shown in FIG. 4, the arrangement is similar to that which has been described with reference to FIG. 2, but the piston 39 is provided as in FIG. 3, and it is with this piston that the jaw 34 co-operates. The piston 39 is provided with a small collar 53 to limit its travel into the bore 37, while the piston 41 is fitted with the collar 52 limiting its travel into the bore 38.

The operation in normal working is similar to that which has been described with reference to FIG. 2. The section of the piston 39 is chosen in such manner that the reaction of the jaw 34 is greater than the action of the primary pressure on the piston 39. On the other hand, after the front wheels are locked, the conditions are reversed. The brake is applied with a self-engaging action by the piston 39. The reaction of the jaw 35 becomes greater than the total force of the piston 41. This latter goes back into abutment and serves as a fixed point.

It will be noted that in the main field of operation, the rear brakes are self-releasing or have a predominantly self-releasing character.

It will of course be understood that the invention is not limited to the forms of construction described and shown, but includes all its alternative forms. For example, the invention is applicable to braking installations in which a single pressure actuates the brakes of a first axle (for example the front axle) and in which the brakes of a second axle (for example the rear axle), instead of being supplied only by the pressure resulting from the reaction produced by the front axle are supplied according to the invention, both by this latter pressure and by the operating braking pressure of the front axle, etc.

I claim:

1. A braking installation for automotive vehicles of the type having first and second axles with brakes for each of said first and second axles, each brake of said second axle comprising a wheel-cylinder having a double piston adapted to operate inside two bores of different diameters and defining a first chamber cooperating with one of the pistons of said double piston and a second chamber cooperating differentially with the two pistons of said double piston, a master cylinder for applying pressure to the brakes of the first axle and to said first chamber, and means for applying reaction pressure from the brakes of said first axle to said second chamber.

2. A braking installation as claimed in claim 1, in which the pressure received by the first chamber of a brake of said second axle is the pressure by which the master-cylinder supplies the brake of said first axle located on the same side of the vehicle as said brake of said second axle.

3. A braking installation as claimed in claim 1, in which each brake of said second axle comprises two jaws in series, one jaw cooperating with one extremity of said wheel-cylinder and the other jaw cooperating with said double piston.

4. A braking installation as claimed in claim 1, in which each brake of said second axle comprises a jaw in compression and a jaw in tension supported against abutment means, the compressed jaw cooperating with an additional piston engaged in one of said bores and spaced apart from said double piston in order to form the first chamber, while the tensioned jaw cooperates with said double piston.

5. A braking installation as claimed in claim 4, in which said additional piston is provided with means for limiting its travel into said wheel-cylinder.

6. A braking installation as claimed in claim 1, in which each brake of said second axle comprises two jaws in series, one jaw cooperating with an additional piston engaged in one of said bores and spaced apart from said double piston so as to form the first chamber, while the other jaw cooperates with said double piston.

7. A braking installation as claimed in claim 1, in which said double piston is provided with means for limiting its travel into said wheel-cylinder.

References Cited

UNITED STATES PATENTS 3,194,019　7/1965　Lepelletier _____ 188—152 X

FOREIGN PATENTS 1,109,546　6/1961　Germany.

FERGUS S. MIDDLETON, *Primary Examiner.*

MILTON BUCHLER, *Examiner.*

G. E. HALVOSA, *Assistant Examiner.*